United States Patent
Jiang

(10) Patent No.: US 10,136,199 B2
(45) Date of Patent: Nov. 20, 2018

(54) OPTICAL TRANSMISSION METHOD AND OPTICAL TRANSMISSION APPARATUS

(71) Applicant: HUAWEI TECHNOLOGIES CO., LTD., Shenzhen, Guangdong (CN)

(72) Inventor: Chendi Jiang, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/962,703

(22) Filed: Apr. 25, 2018

(65) Prior Publication Data

US 2018/0249231 A1    Aug. 30, 2018

Related U.S. Application Data

(63) Continuation of application No. PCT/CN2016/086578, filed on Jun. 21, 2016.

(30) Foreign Application Priority Data

Oct. 26, 2015    (CN) .......................... 2015 1 0701443

(51) Int. Cl.
   *H04J 14/00*    (2006.01)
   *H04J 14/02*    (2006.01)
   (Continued)

(52) U.S. Cl.
   CPC .......... *H04Q 11/0005* (2013.01); *H04J 14/02* (2013.01); *G02B 6/14* (2013.01);
   (Continued)

(58) Field of Classification Search
   CPC ....... H04Q 11/0005; H04Q 2011/0009; H04Q 2011/0016; H04J 14/02; H04B 10/27
   (Continued)

(56) References Cited

U.S. PATENT DOCUMENTS 6,510,261 B2 *    1/2003    Sorin ....................... G02B 6/14
                                                            383/15
6,532,322 B1 *    3/2003    Kim .................... G02B 6/02052
                                                            385/140
(Continued)

FOREIGN PATENT DOCUMENTS

CN    103023559 A    4/2013
CN    104350698 A    2/2015
(Continued)

OTHER PUBLICATIONS

International Search Report issued in International Application No. PCT/CN2016/086578 dated Sep. 1, 2016, 13 pages.
(Continued)

*Primary Examiner* — Ken N Vanderpuye
*Assistant Examiner* — Abbas H Alagheband
(74) *Attorney, Agent, or Firm* — Fish & Richardson P.C.

(57) ABSTRACT

The present application discloses example optical transmission apparatuses, where one example apparatus includes a filter, a router, and an optical multiplexer. The filter is connected to the router, and the router is connected to the optical multiplexer. The filter performs parity optical demultiplexing on 2N input optical signal groups by using 2N comb filters to obtain 2N odd optical signal groups and 2N even optical signal groups, and sends the 2N odd optical signal groups and the 2N even optical signal groups to the router. The router separately routes the 2N odd optical signal groups and the 2N even optical signal groups to the optical multiplexer by using at least four AWGRs. The optical multiplexer performs, by using 2N optical multiplexers, optical multiplexing on 4N optical signal groups output by the router to obtain 2N output optical signal groups.

7 Claims, 7 Drawing Sheets

(51) Int. Cl.
  *H04Q 11/00* (2006.01)
  *H04B 10/27* (2013.01)
  *G02B 6/14* (2006.01)
  *G02B 6/26* (2006.01)
  *H04B 10/071* (2013.01)

(52) U.S. Cl.
  CPC .............. *G02B 6/26* (2013.01); *H04B 10/071* (2013.01); *H04B 10/27* (2013.01); *H04Q 2011/0009* (2013.01); *H04Q 2011/0016* (2013.01)

(58) Field of Classification Search
  USPC .................................. 398/49, 43, 45, 47, 79
  See application file for complete search history.

(56) References Cited

U.S. PATENT DOCUMENTS

| | | | | |
|---|---|---|---|---|
| 6,943,925 B1* | 9/2005 | Islam | .................... | G02B 6/3516 359/108 |
| 7,466,918 B1* | 12/2008 | Lam | .................... | H04J 14/0206 398/69 |
| 7,593,607 B2* | 9/2009 | Beshai | ................ | H04J 14/0227 385/17 |
| 8,064,341 B2* | 11/2011 | Beshai | .................... | H04L 45/62 370/230 |
| 2001/0028757 A1* | 10/2001 | Lee | .................... | G02B 6/12019 385/24 |
| 2011/0038636 A1* | 2/2011 | Akiyama | ............ | H04J 14/0204 398/85 |
| 2012/0008950 A1* | 1/2012 | Jander | .................... | G02B 6/272 398/65 |
| 2013/0223796 A1* | 8/2013 | Mun | ........................ | H04J 14/02 385/37 |
| 2015/0215066 A1* | 7/2015 | Testa | .................... | H04J 14/0212 398/48 |
| 2016/0044393 A1* | 2/2016 | Graves | ............... | H04Q 11/0003 398/51 |
| 2017/0019168 A1* | 1/2017 | Menard | ............. | G02B 6/29395 |

FOREIGN PATENT DOCUMENTS

| | | |
|---|---|---|
| CN | 104836624 A | 8/2015 |
| JP | 2014074856 A | 4/2014 |
| JP | 5498553 B2 | 5/2014 |

OTHER PUBLICATIONS

Chinese Office Action issued in Chinese Application No. 201510701443.8 dated Feb. 14, 2018, 5 pages.

* cited by examiner

OPTICAL TRANSMISSION METHOD AND OPTICAL TRANSMISSION APPARATUS

CROSS-REFERENCE TO RELATED APPLICATIONS

This application is a continuation of International Application No. PCT/CN2016/086578, filed on Jun. 21, 2016, which claims priority to Chinese Patent Application No. 201510701443.8, filed on Oct. 26, 2015. The disclosures of the aforementioned applications are hereby incorporated by reference in their entireties.

TECHNICAL FIELD

The present invention relates to the communications field, and in particular, to an optical transmission method and an optical transmission apparatus.

BACKGROUND

As the world is developing in a more intelligent, instrumented, and perceptive direction, data is experiencing an explosive growth, a scale of a data center network is rapidly expanding, and internal communication traffic of the data center network increases rapidly. For a conventional electrical packet switch exchange, due to a limit of a switching capability, electrical switching can hardly adapt to a development tendency of a data center. Therefore, a fiber optic communications technology starts to be introduced to the data center network, so as to provide an optical interconnection service with a low latency and a high bandwidth.

Specifically, in the prior art, an arrayed waveguide grating router (AWGR) is usually introduced to the data center network. The AWGR performs routing based on a wavelength. In an optical interconnection network, provided that data is modulated to a proper optical wavelength, the AWGR can forward the data to a corresponding port without configuration.

However, an optical signal is affected by a warm-up drift effect in a transmission process. Therefore, an existing single AWGR can route 32 optical signals at most. That is, a maximum scale of the single AWGR includes 32 input ports and 32 output ports. If the scale of the AWGR is further expanded, it is difficult to control a center wavelength shift of the optical signal caused by the warm-up drift effect. When the center wavelength shift goes beyond a specific range, some optical signals may be lost.

In the prior art, there is no proper solution in which a quantity of to-be-routed optical signals can be increased when it is ensured that the center wavelength shift is controllable.

SUMMARY

An objective of the present invention is to provide an optical transmission method and an optical transmission apparatus, so as to increase a quantity of to-be-routed optical signals when it is ensured that a center wavelength shift is controllable.

To achieve the foregoing objective, embodiments of the present invention use the following technical solutions:

According to a first aspect, an optical transmission apparatus is provided, including:

a filter module, a router module, and an optical multiplexer module, where the filter module is connected to the router module, and the router module is connected to the optical multiplexer module;

the filter module includes 2N comb filters, and the filter module performs parity optical demultiplexing on 2N input optical signal groups by using the 2N comb filters, so as to obtain 2N odd optical signal groups and 2N even optical signal groups, and sends the 2N odd optical signal groups and the 2N even optical signal groups to the router module, where N is a positive integer greater than 1, the input optical signal group includes multiple optical signals, the odd optical signal group of the input optical signal group includes odd optical signals in the input optical signal group, and the even optical signal group of the input optical signal group includes even optical signals in the input optical signal group;

the router module includes at least four arrayed waveguide grating routers AWGRs, the router module separately routes the 2N odd optical signal groups and the 2N even optical signal groups to the optical multiplexer module by using the at least four AWGRs, where the AWGR includes N input ports and N output ports, and the AWGR is configured to switch optical signals input from each input port to the N output ports for output; and the optical multiplexer module includes 2N optical multiplexers, the optical multiplexer module performs, by using the 2N optical multiplexers, optical multiplexing on 4N optical signal groups output by the router module to obtain 2N output optical signal groups, where each output optical signal group includes one optical signal in each of the 2N input optical signal groups.

According to a second aspect, an optical transmission method is provided, where the method is applied to an optical transmission apparatus, the optical transmission apparatus includes a filter module, a router module, and an optical multiplexer module, the filter module is connected to the router module, the router module is connected to the optical multiplexer module, and the method includes:

performing, by the optical transmission apparatus, parity optical demultiplexing on 2N input optical signal groups by using 2N comb filters included in the filter module, so as to obtain 2N odd optical signal groups and 2N even optical signal groups, and sending the 2N odd optical signal groups and the 2N even optical signal groups to the router module, where N is a positive integer greater than 1, the input optical signal group includes multiple optical signals, the odd optical signal group of the input optical signal group includes odd optical signals in the input optical signal group, and the even optical signal group of the input optical signal group includes even optical signals in the input optical signal group;

separately routing the 2N odd optical signal groups and the 2N even optical signal groups to the optical multiplexer module by using at least four arrayed waveguide grating routers AWGRs included in the router module, where the AWGR includes N input ports and N output ports, and the AWGR is configured to switch optical signals input from each input port to the N output ports for output; and performing, by using 2N optical multiplexers included in the optical multiplexer module, optical multiplexing on 4N optical signal groups output by the router module to obtain 2N output optical signal groups, where each output optical signal group includes one optical signal in each of the 2N input optical signal groups.

BRIEF DESCRIPTION OF DRAWINGS

To describe the technical solutions in embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

To make a person skilled in the art to more easily understand technical solutions provided in the present invention, the following first briefly introduces a working principle of an AWGR.

Figure 1:
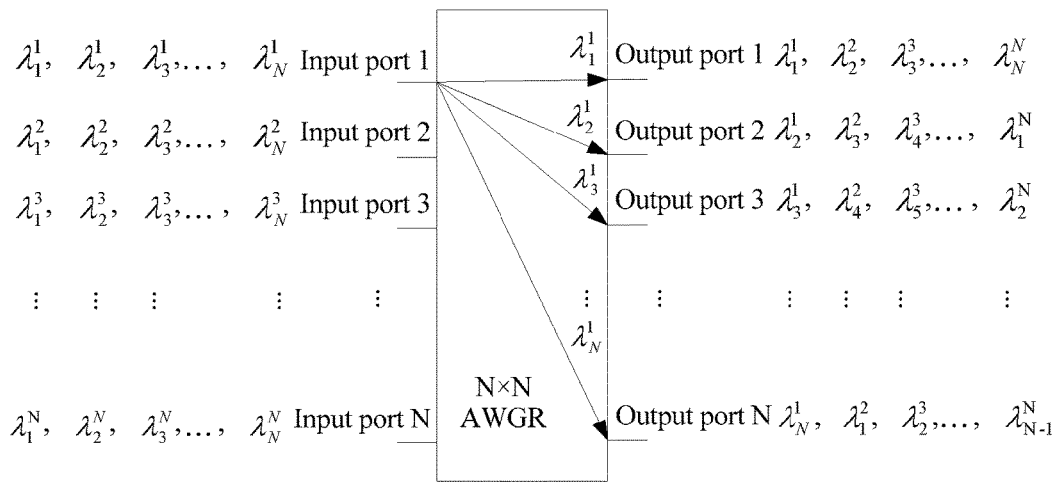
FIG. 1 is a schematic diagram in which an AWGR routes an input optical signal group according to an embodiment of the present invention.

FIG. 1 shows an AWGR with N input ports and N output ports, which is referred to as an N×N AWGR. As shown in FIG. 1, optical signals in an optical signal group $\lambda_1^1, \lambda_2^1, \lambda_3^1, \ldots \lambda_N^2$ input from an input port 1 are successively routed to the N output ports by using the AWGR. In this way, after the AWGR routes optical signal groups input from the input ports shown in FIG. 1, an optical signal group output from an output port 1 is $\lambda_1^1, \lambda_2^2, \lambda_3^3, \ldots \lambda_N^N$, an optical signal group output from an output port 2 is $\lambda_2^1, \lambda_3^2, \lambda_4^3, \ldots \lambda_1^N$, an optical signal group output from an output port 3 is $\lambda_3^1, \lambda_4^2, \lambda_5^3, \ldots \lambda_2^N, \ldots$, and an optical signal group output from an output port N is $\lambda_N^1, \lambda_1^2, \lambda_2^3, \ldots \lambda_{N-1}^N$.

It should be noted that, in an input optical signal group, different optical signals have different carrier wavelengths. In addition, to ensure that the optical signals can be correctly routed, in a transmission process of the input optical signal group, a center wavelength shift of the input optical signal group cannot be greater than one fifth of a wavelength interval of the input optical signal group. That is, if the wavelength interval of the input optical signal group is 50 GHz (gigahertz), a center wavelength shift of 10 GHz is allowed; or if the wavelength interval of the input optical signal group is 100 GHz, a center wavelength shift of 20 GHz is allowed. Due to a technological limit, an existing single AWGR can route 32 optical signals at most. If a routing scale is further expanded, the optical signals have an excessive center wavelength shift, and this causes some optical signals to be lost.

The present invention provides an optical transmission method and an optical transmission apparatus, and is intended to increase a quantity of to-be-routed optical signals when it is ensured that a center wavelength shift is controllable.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 2:
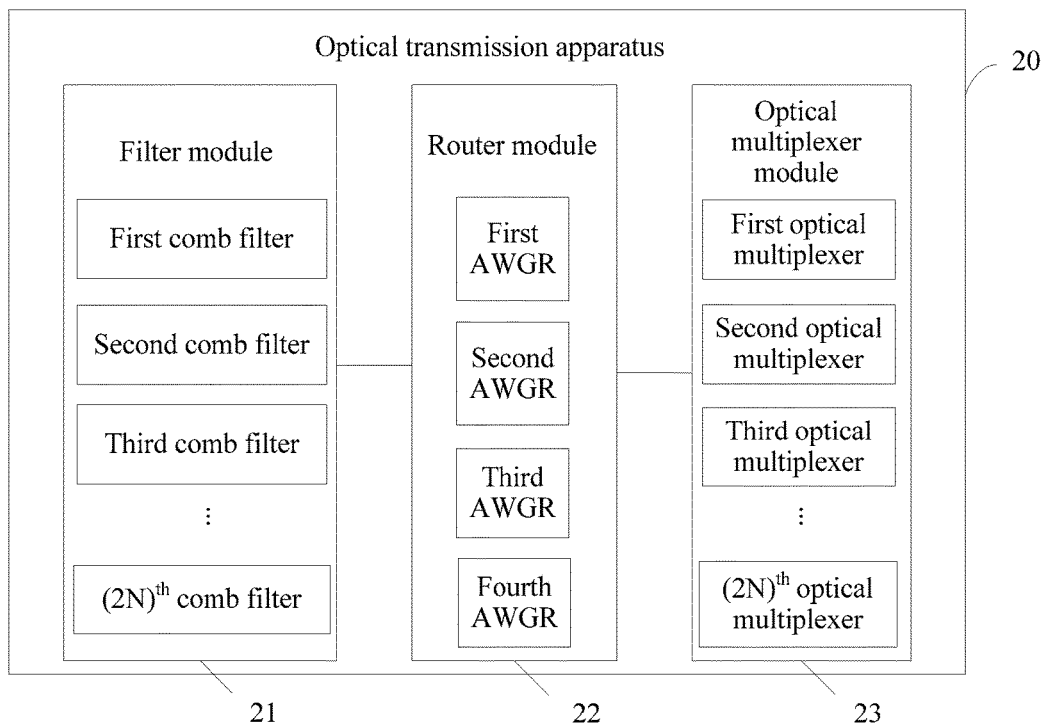
FIG. 2 is a schematic structural diagram of an optical transmission apparatus according to an embodiment of the present invention.

First, an embodiment of the present invention provides an optical transmission apparatus 20. As shown in FIG. 2, the optical transmission apparatus 20 includes:

a filter module 21, a router module 22, and an optical multiplexer module 23, where the filter module 21 is connected to the router module 22, and the router module 22 is connected to the optical multiplexer module 23.

The filter module 21 includes 2N comb filters, the filter module 21 performs parity optical demultiplexing on 2N input optical signal groups by using the 2N comb filters, so as to obtain 2N odd optical signal groups and 2N even optical signal groups, and sends the 2N odd optical signal groups and the 2N even optical signal groups to the router module.

N is a positive integer greater than 1, the input optical signal group includes multiple optical signals, the odd optical signal group of the input optical signal group includes odd optical signals in the input optical signal group, and the even optical signal group of the input optical signal group includes even optical signals in the input optical signal group.

The router module 22 includes at least four arrayed waveguide grating routers AWGRs, and the router module 22 separately routes the 2N odd optical signal groups and the 2N even optical signal groups to the optical multiplexer module by using the at least four AWGRs.

The AWGR includes N input ports and N output ports, and the AWGR is configured to switch optical signals input from each input port to the N output ports for output.

The optical multiplexer module 23 includes 2N optical multiplexers, and the optical multiplexer module 23 performs, by using the 2N optical multiplexers, optical multiplexing on 4N optical signal groups output by the router module to obtain 2N output optical signal groups.

Each output optical signal group includes one optical signal in each of the 2N input optical signal groups.

It should be noted that, the comb filter mentioned in this embodiment may be an optical comb filter. The optical comb filter may work in a demultiplexing mode or a multiplexing mode. In addition, a first end of the optical comb filter includes one port, and a second end includes two ports: an odd port and an even port.

When the optical comb filter is in the demultiplexing mode, the first end of the optical comb filter is used as an input port, and the second end is used as an output port. For multiple optical signals of different carrier wavelengths in the input optical signal group, the comb filter may perform interleaved demultiplexing on the multiple optical signals according to wavelength order, so as to obtain two output optical signal groups. An optical signal group output from the odd port is the odd optical signal group, and an optical signal group output from the even port is the even optical signal group. For example, wavelengths of 1, 2, 3, . . . are input from the input port, and after the comb filter performs demultiplexing, odd wavelengths of 1, 3, 5, . . . are output from the odd port, and even wavelengths of 2, 4, 6, . . . are output from the even port. In this case, odd optical signals included in the odd optical signal group are optical signals carried on the odd wavelengths, and even optical signals included in the even optical signal group are optical signals carried on the even wavelengths.

When the optical comb filter is in the multiplexing mode, the second end of the optical comb filter is used as an input port, and the first end is used as an output port. In this case, the optical comb filter may perform optical multiplexing on two optical signal groups input from the odd port and the even port. That is, the optical multiplexer mentioned in this embodiment of the present invention may be an optical comb filter; a difference lies in that the optical comb filter in the filter module works in the demultiplexing mode, and the optical comb filter in the optical multiplexer module works in the multiplexing mode.

The foregoing is merely an example, and the optical multiplexer in the optical multiplexer module may be another optical device used for multiplexing, such as a combiner.

When the foregoing optical transmission apparatus is used, the optical transmission apparatus performs parity optical demultiplexing on 2N input optical signal groups whose wavelength interval is w, so as to obtain 2N odd optical signal groups whose wavelength interval is 2w and 2N even optical signal groups whose wavelength interval is 2w, and routes the odd optical signal groups whose wavelength interval is 2w and the even optical signal groups whose wavelength interval is 2w by using multiple N×N AWGRs. Compared with the prior art in which an N×N AWGR can be used to route merely N optical signal groups whose wavelength interval is 2w, the optical transmission apparatus provided in this embodiment of the present invention can accurately route 2N input optical signal groups. This ensures that a quantity of optical signal groups that can be routed is increased when a center wavelength shift of the AWGR is controllable.

The following describes a specific implementation of the optical transmission apparatus provided in this embodiment of the present invention in detail.

Specifically, each comb filter may be configured to receive one optical signal group, each comb filter includes a first output port and a second output port, the first output port is configured to output an odd optical signal group, and the second output port is configured to output an even optical signal group. A first output port of a $K^{th}$ comb filter in the filter module 21 is connected to an input port of a first AWGR in the router module, and K is an odd number in a numerical interval [1, 2N]. A first output port of an $L^{th}$ comb filter in the filter module 21 is connected to an input port of a second AWGR in the router module, and L is an even number in the numerical interval [1, 2N]. A second output port of the $K^{th}$ comb filter in the filter module 21 is connected to an input port of a third AWGR in the router module. A second output port of the $L^{th}$ comb filter in the filter module 21 is connected to an input port of a fourth AWGR in the router module.

That is, the first AWGR in the router module is configured to route an odd optical signal group output by an odd comb filter in the filter module, the second AWGR is configured to route an odd optical signal group output by an even comb filter in the filter module, the third AWGR is configured to route an even optical signal group output by the odd comb filter in the filter module, and the fourth AWGR is configured to route an even optical signal group output by the even comb filter in the filter module.

Optionally, the first output port of the $K^{th}$ comb filter in the filter module 21 is connected to a $[(K+1)/2]^{th}$ input port of the first AWGR, the first output port of the $L^{th}$ comb filter in the filter module 21 is connected to an $(L/2)^{th}$ input port of the second AWGR, the second output port of the $K^{th}$ comb filter in the filter module 21 is connected to a $[(K+1)/2]^{th}$ input port of the third AWGR, and the second output port of the $L^{th}$ comb filter in the filter module 21 is connected to an $(L/2)^{th}$ input port of the fourth AWGR.

Figure 3:
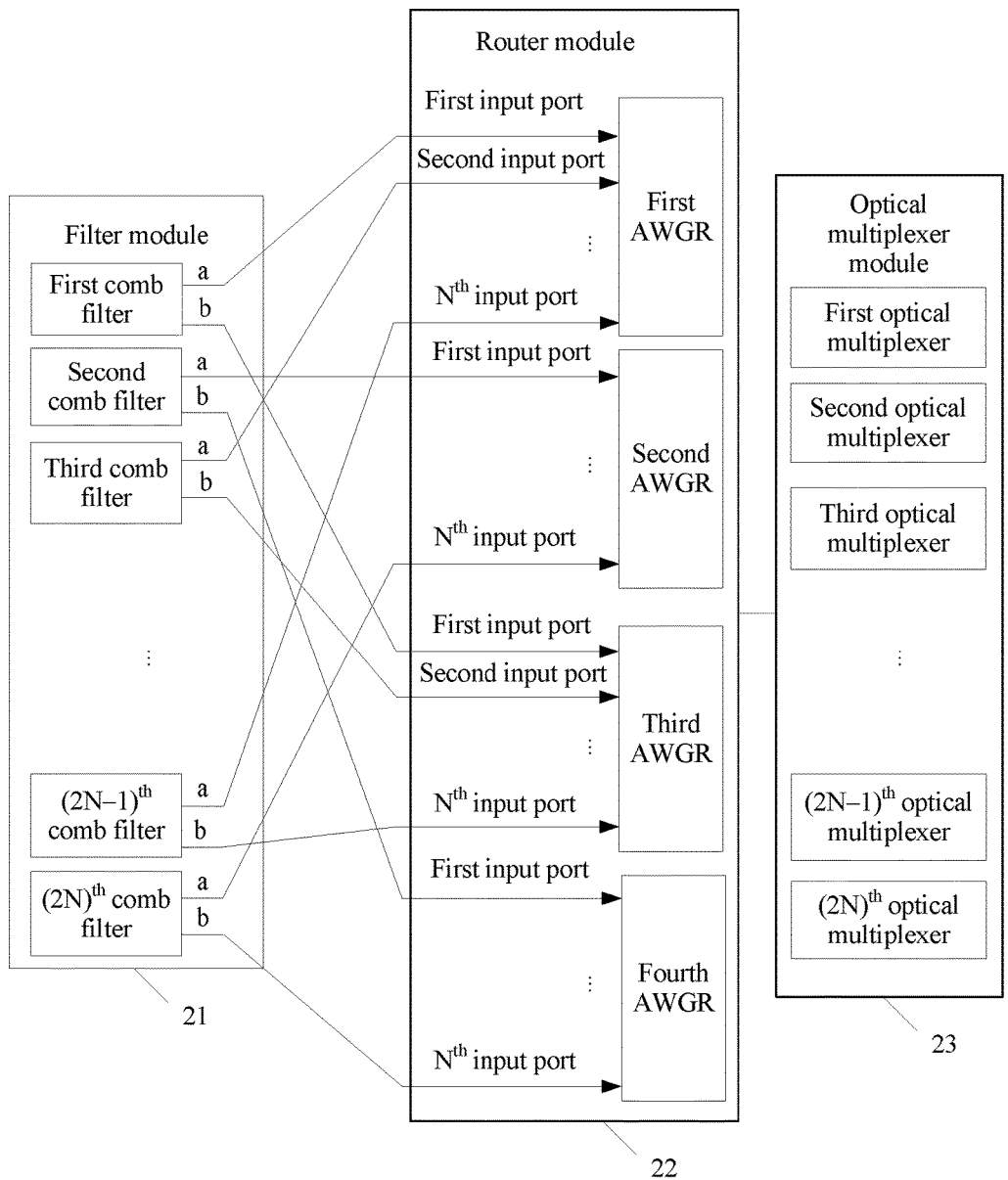
FIG. 3 is a schematic diagram of a connection between a filter module and a router module in the optical transmission apparatus shown in FIG. 2.

For example, FIG. 3 is a schematic diagram of a specific connection between the filter module 21 and the router module 22. A first output port included in each filter is a shown in FIG. 3, and a second output port is b shown in FIG. 3. In addition, an a port of the first comb filter is connected to the first input port of the first AWGR, a b port of the first comb filter is connected to the first input port of the third AWGR, an a port of the second comb filter is connected to the first input port of the second AWGR, a b port of the second comb filter is connected to the first input port of the fourth AWGR, an a port of the third comb filter is connected to the second input port of the first AWGR, and a b port of the third comb filter is connected to the second input port of the third AWGR. By analogy, an a port of a $(2N-1)^{th}$ comb filter in the filter module is connected to an $N^{th}$ input port of the first AWGR, a b port of the $(2N-1)^{th}$ comb filter is connected to an $N^{th}$ input port of the third AWGR, an a port of a $(2N)^{th}$ comb filter is connected to an $N^{th}$ input port of the second AWGR, and a b port of the $(2N)^{th}$ comb filter is connected to an $N^{th}$ input port of the fourth AWGR.

Optionally, each optical multiplexer includes a first input port and a second input port, the first input port is configured to receive the odd optical signal, and the second input port is configured to receive the even optical signal. A $[(K+1)/2]^{th}$ output port of the first AWGR is connected to a first input port of a $K^{th}$ optical multiplexer in the optical multiplexer module, a $[(K+1)/2]^{th}$ output port of the fourth AWGR is connected to a second input port of the $K^{th}$ optical multiplexer in the optical multiplexer module, the first output port of the second AWGR is connected to a first input port of a $(2N)^{th}$ optical multiplexer in the optical multiplexer module, an $N^{th}$ output port of the third AWGR is connected to a second input port of the $(2N)^{th}$ optical multiplexer, an $(M/2+1)^{th}$ output port of the second AWGR is connected to a first input port of an $M^{th}$ optical multiplexer in the optical multiplexer module, and an $(M/2)^{th}$ output port of the third AWGR is connected to a second input port of the $M^{th}$ optical multiplexer in the optical multiplexer module, where M is an even number in a numerical interval [1, 2N).

Figure 4A:
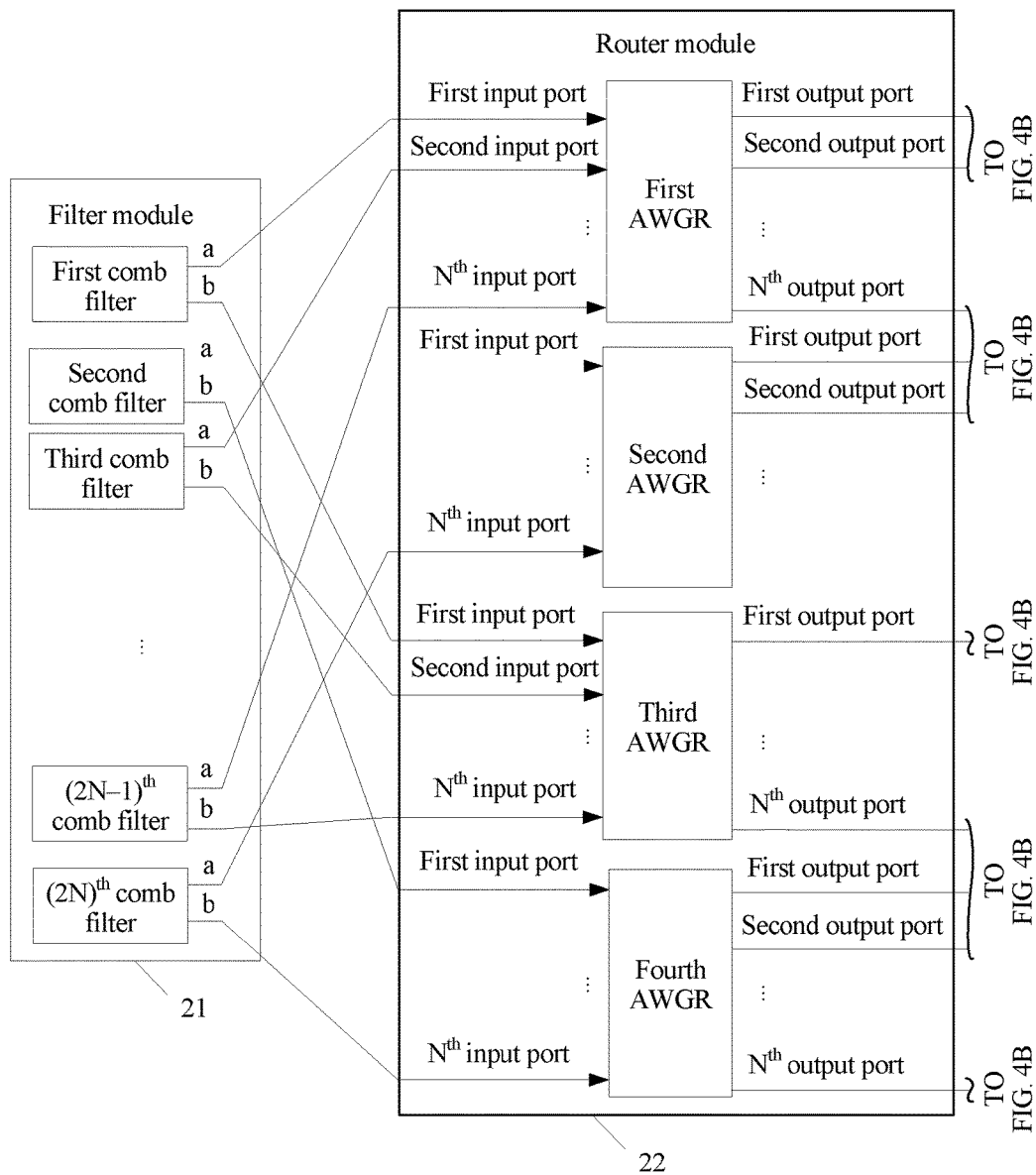
FIG. 4A and FIG. 4B are a schematic diagram of a connection between a router module and an optical multiplexer module in the optical transmission apparatus shown in FIG. 2.
Figure 4B:
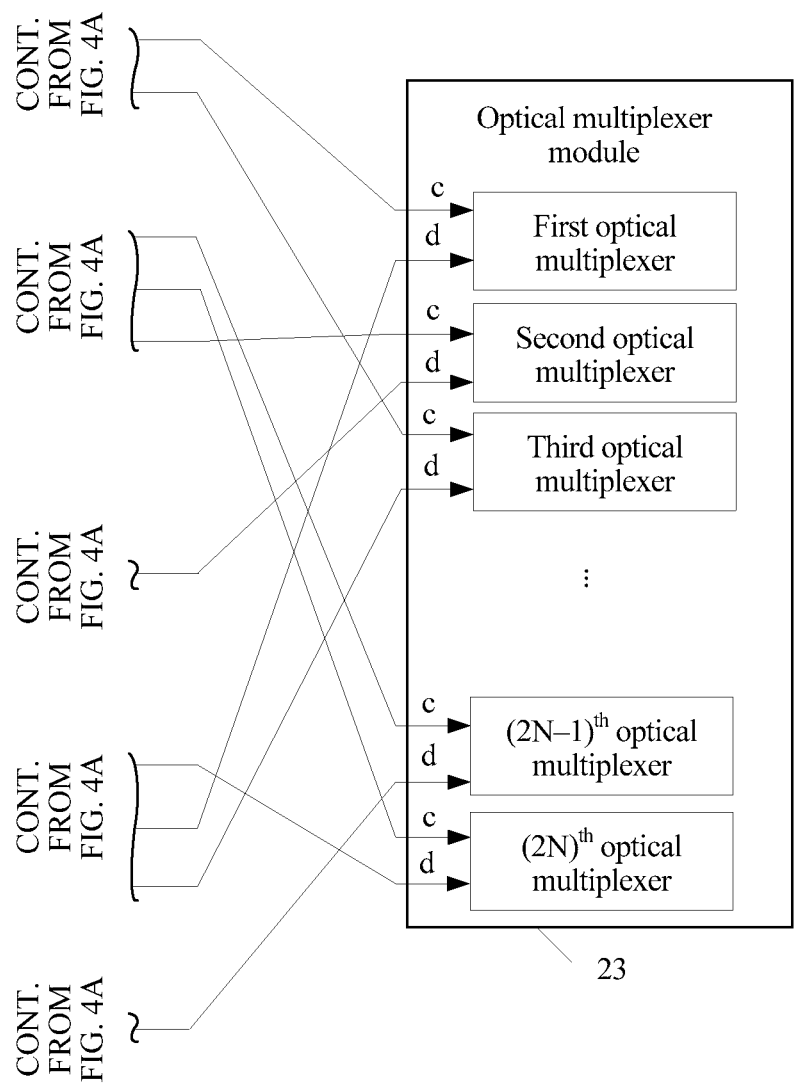

For example, FIG. 4A and FIG. 4B are a schematic diagram of a specific connection between the router module 22 and the optical multiplexer module 23. A first input port included in each optical multiplexer is c shown in FIG. 4A and FIG. 4B, and a second input port is d shown in FIG. 4A and FIG. 4B. In addition, a c port of the first optical multiplexer is connected to the first output port of the first AWGR, and a d port is connected to the first output port of the fourth AWGR. A c port of the second optical multiplexer is connected to the second output port of the second AWGR, and a d port is connected to the first output port of the third AWGR. A c port of the third optical multiplexer is connected to the second output port of the first AWGR, and a d port is connected to the second output port of the fourth AWGR. By analogy, a c port of a $(2N-1)^{th}$ optical multiplexer is connected to an $N^{th}$ output port of the first AWGR, and a d port is connected to an $N^{th}$ output port of the fourth AWGR. A c port of a $(2N)^{th}$ optical multiplexer is connected to the first output port of the second AWGR, and a d port is connected to an $N^{th}$ output port of the third AWGR.

With reference to FIG. 4A and FIG. 4B, it can be learned that an odd optical multiplexer in the optical multiplexer module 23 is configured to perform optical multiplexing on the odd optical signal group output by the odd comb filter in the filter module 21 and the even optical signal group output by the even comb filter in the filter module 21; an even optical multiplexer in the optical multiplexer module 23 is configured to perform optical multiplexing on the even optical signal group output by the odd comb filter in the filter module 21 and the odd optical signal group output by the even comb filter in the filter module 21, so that an optical signal group output by each optical multiplexer includes one optical signal in all input optical signal groups. It should be noted that an input port of each comb filter may be considered as an input port of the optical transmission apparatus, and an output port of each optical multiplexer may be considered as an output port of the optical transmission apparatus. In this way, when the optical transmission apparatus is specifically used, provided that data is modulated to a proper optical wavelength, the optical transmission apparatus can forward optical signals in each input optical signal group to corresponding ports, and the optical signal group can be accurately routed.

Figure 5A:
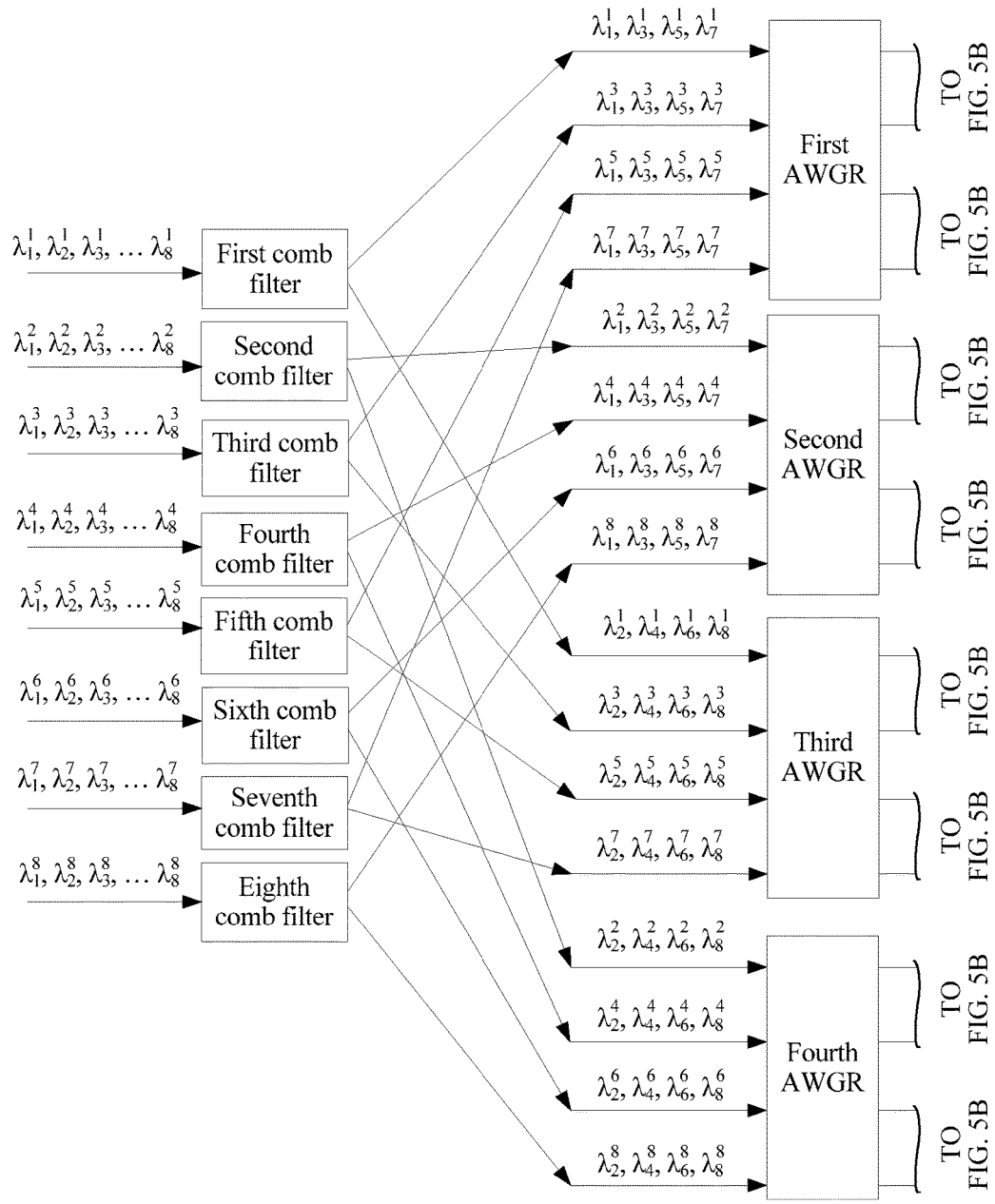
FIG. 5A and FIG. 5B are a schematic diagram in which an optical transmission apparatus routes eight input optical signal groups according to an embodiment of the present invention.
Figure 5B:
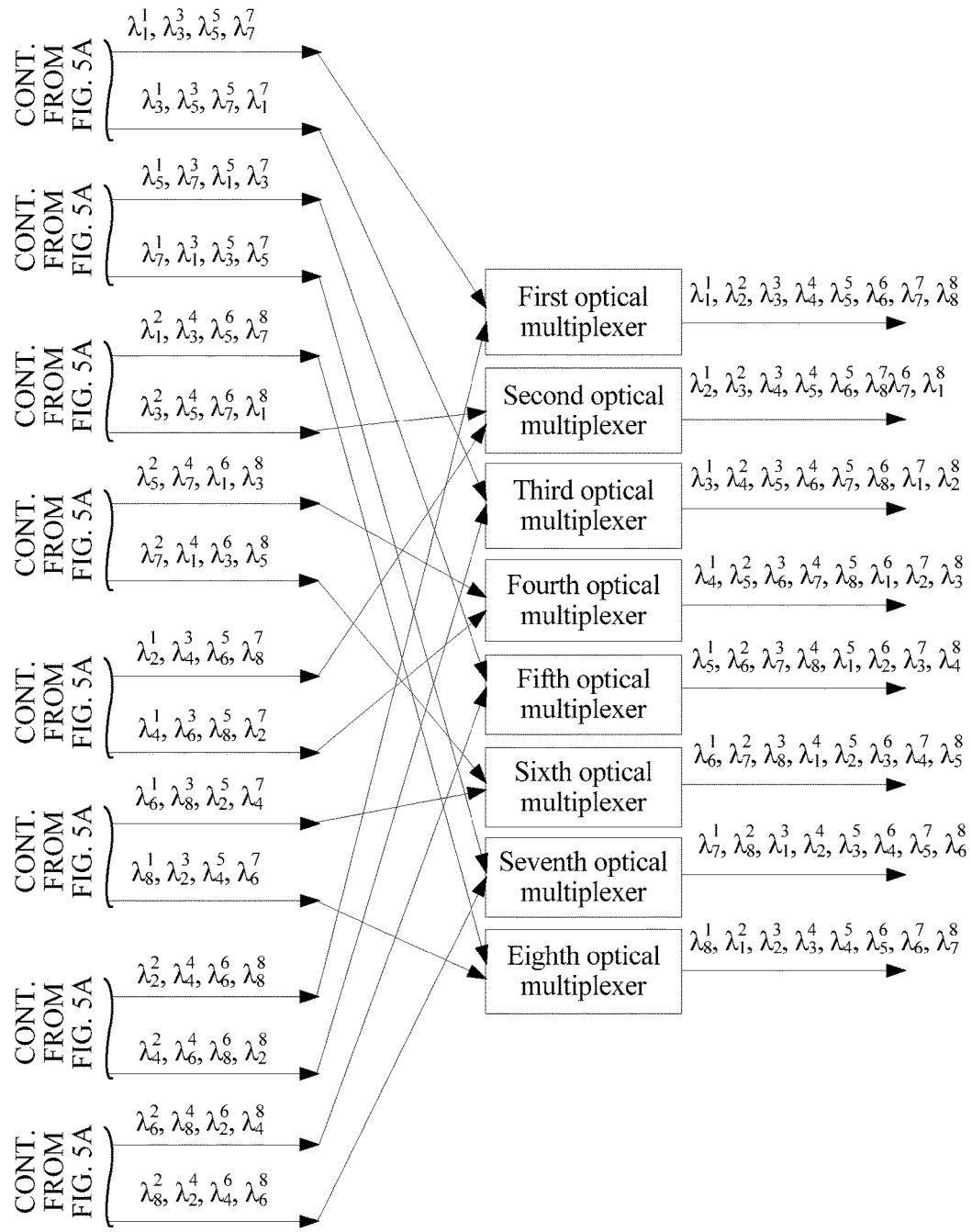

To make a person skilled in the art more easily understand the optical transmission apparatus provided in this embodiment of the present invention, the following uses N=4 as an example to describe the optical transmission apparatus provided in this embodiment of the present invention. As shown in FIG. 5A and FIG. 5B, when N=4, the filter module 21 of the optical transmission apparatus includes the first to the eighth comb filters, the router module includes the first AWGR, the second AWGR, the third AWGR, and the fourth AWGR, and the optical multiplexer module includes the first to the eighth optical multiplexers. For a specific connection structure of the optical transmission apparatus, refer to FIG. 4A and FIG. 4B, and details are not described herein. The following describes a specific working process of the optical transmission apparatus in detail.

As shown in FIG. 5A and FIG. 5B, the first comb filter receives an input optical signal group $\lambda_1^1, \lambda_2^1, \lambda_3^1, \ldots \lambda_8^1$, the second comb filter receives an input optical signal group $\lambda_1^2, \lambda_2^2, \lambda_3^2, \ldots \lambda_8^2$, the third comb filter receives an input optical signal group $\lambda_1^3, \lambda_2^3, \lambda_3^3, \ldots \lambda_8^3$, the fourth comb filter receives an input optical signal group $\lambda_1^4, \lambda_2^4, \lambda_3^4, \ldots \lambda_8^4$, the fifth comb filter receives an input optical signal group $\lambda_1^5, \lambda_2^5, \lambda_3^5, \ldots \lambda_8^5$, the sixth comb filter receives an input optical signal group $\lambda_2^6, \lambda_2^6, \lambda_3^6, \ldots \lambda_8^6$, the seventh comb filter receives an input optical signal group $\lambda_1^7, \lambda_2^7, \lambda_3^7, \ldots \lambda_8^7$, and the eight comb filter receives an input optical signal group $\lambda_1^8, \lambda_2^8, \lambda_3^8, \ldots \lambda_8^8$.

In this way, after each comb filter performs parity optical demultiplexing on each input optical signal group, odd optical signal groups successively received by four input ports of the first AWGR are $\lambda_1^1, \lambda_3^1, \lambda_5^1, \lambda_7^1; \lambda_1^3, \lambda_3^3, \lambda_5^3, \lambda_7^3; \lambda_1^5, \lambda_3^5, \lambda_5^5, \lambda_7^5; \lambda_1^7, \lambda_3^7, \lambda_5^7, \lambda_7^7$. Odd optical signal groups successively received by four input ports of the second AWGR are $\lambda_1^2, \lambda_3^2, \lambda_5^2, \lambda_7^2; \lambda_1^4, \lambda_3^4, \lambda_5^4, \lambda_7^4; \lambda_1^6, \lambda_3^6, \lambda_5^6, \lambda_7^6; \lambda_1^8, \lambda_3^8, \lambda_5^8, \lambda_7^8$. Even optical signal groups successively received by four input ports of the third AWGR are $\lambda_2^1, \lambda_4^1, \lambda_6^1, \lambda_8^1; \lambda_2^3, \lambda_4^3, \lambda_6^3, \lambda_8^3; \lambda_2^5, \lambda_4^5, \lambda_6^5, \lambda_8^5; \lambda_2^7, \lambda_4^7, \lambda_6^7, \lambda_8^7$; and even optical signal groups successively received by four input ports of the fourth AWGR are $\lambda_2^2, \lambda_4^2, \lambda_6^2, \lambda_8^2; \lambda_2^4, \lambda_4^4, \lambda_6^4, \lambda_8^4; \lambda_2^6, \lambda_4^6, \lambda_6^6, \lambda_8^6; \lambda_2^8, \lambda_4^8, \lambda_6^8, \lambda_8^8$.

Further, after the first to the fourth AWGRs perform routing, four output ports of the first AWGR successively output $\lambda_1^1, \lambda_3^3, \lambda_5^5, \lambda_7^7; \lambda_3^1, \lambda_1^3, \lambda_7^5, \lambda_5^7; \lambda_5^1, \lambda_7^3, \lambda_1^5, \lambda_3^7; \lambda_7^1; \lambda_1^3, \lambda_3^5, \lambda_5^7$; four output ports of the second AWGR successively output $\lambda_1^2, \lambda_3^4, \lambda_5^6, \lambda_7^8; \lambda_3^2, \lambda_1^4, \lambda_5^4, \lambda_7^6, \lambda_1^8; \lambda_5^2, \lambda_7^4, \lambda_3^6, \lambda_1^8; \lambda_7^2, \lambda_2^4, \lambda_1^4, \lambda_3^6, \lambda_5^8$; four output ports of the third AWGR successively output $\lambda_2^1, \lambda_4^3, \lambda_6^5, \lambda_8^7; \lambda_4^1, \lambda_6^3, \lambda_8^5, \lambda_2^7; \lambda_6^1, \lambda_8^3, \lambda_2^5, \lambda_4^7; \lambda_8^1, \lambda_2^3, \lambda_4^5, \lambda_6^7$; and four output ports of the fourth AWGR successively output $\lambda_2^2, \lambda_4^4, \lambda_6^6, \lambda_8^8; \lambda_4^2, \lambda_6^4, \lambda_8^6, \lambda_2^8; \lambda_6^2, \lambda_8^4, \lambda_2^6, \lambda_4^8; \lambda_8^2, \lambda_2^4, \lambda_4^4, \lambda_6^8$.

Further, the first optical multiplexer performs optical multiplexing on $\lambda_1^1, \lambda_3^3, \lambda_5^5, \lambda_7^7$ output by the first output port of the first AWGR and $\lambda_2^2, \lambda_4^4, \lambda_6^6, \lambda_8^8$ output by the first output port of the fourth AWGR, so as to obtain an output optical signal group $\lambda_1^1, \lambda_2^2, \lambda_3^3, \lambda_4^4, \lambda_5^5, \lambda_6^6, \lambda_7^7, \lambda_8^8$. The second optical multiplexer performs optical multiplexing on $\lambda_3^2, \lambda_5^4, \lambda_7^6, \lambda_1^8$ output by the second output port of the second AWGR and $\lambda_2^1, \lambda_4^3, \lambda_6^5, \lambda_8^7$, a output by the first output port of the third AWGR, so as to obtain an output optical signal group $\lambda_2^1, \lambda_3^2, \lambda_4^3, \lambda_5^4, \lambda_6^5, \lambda_7^6, \lambda_8^7, \lambda_1^8$. The third optical multiplexer performs optical multiplexing on $\lambda_3^1, \lambda_5^3, \lambda_7^5, \lambda_1^7$ output by the second output port of the first AWGR and $\lambda_4^2, \lambda_6^4, \lambda_8^6, \lambda_2^8$ output by the second output port of the fourth AWGR, so as to obtain an output optical signal group $\lambda_3^1, \lambda_4^2, \lambda_5^3, \lambda_6^4, \lambda_7^5, \lambda_8^6, \lambda_1^7, \lambda_2^8$. The fourth optical multiplexer performs optical multiplexing on $\lambda_5^2, \lambda_7^4, \lambda_3^6, \lambda_1^8$ output by the third output port of the second AWGR and $\lambda_4^1, \lambda_6^3, \lambda_8^5, \lambda_2^7$ output by the second output port of the third AWGR, so as to obtain an output optical signal group $\lambda_4^1, \lambda_5^2, \lambda_6^3, \lambda_7^4, \lambda_8^5, \lambda_1^6, \lambda_2^7, \lambda_3^8$. The fifth optical multiplexer performs optical multiplexing on $\lambda_5^1, \lambda_7^3, \lambda_3^5, \lambda_1^7$ output by the third output port of the first AWGR and $\lambda_6^2, \lambda_8^4, \lambda_2^6, \lambda_4^8$ output by the third output port of the fourth AWGR, so as to obtain an output optical signal group $\lambda_5^1, \lambda_6^2, \lambda_7^3, \lambda_8^4, \lambda_1^5, \lambda_2^6, \lambda_3^7, \lambda_4^8$. The sixth optical multiplexer performs optical multiplexing on $\lambda_7^2, \lambda_1^4, \lambda_3^6, \lambda_5^8$ output by the fourth output port of the second AWGR and $\lambda_6^1, \lambda_8^3, \lambda_2^5, \lambda_4^7$, output by the third output port of the third AWGR, so as to obtain an output optical signal group $\lambda_6^1, \lambda_7^2, \lambda_8^3, \lambda_1^4, \lambda_2^5, \lambda_3^6, \lambda_4^7, \lambda_5^8$. The seventh optical multiplexer performs optical multiplexing on $\lambda_7^1, \lambda_1^3, \lambda_3^5, \lambda_5^7$ output by the fourth output port of the first AWGR and $\lambda_8^2, \lambda_2^4, \lambda_4^6, \lambda_6^8$ output by the fourth output port of the fourth AWGR, so as to obtain an output optical signal group $\lambda_7^1, \lambda_8^2, \lambda_1^2, \lambda_2^4, \lambda_3^5, \lambda_4^6, \lambda_5^7, \lambda_6^8$. The eighth optical multiplexer performs optical multiplexing on $\lambda_1^2, \lambda_3^4, \lambda_5^6, \lambda_7^8$ output by the first output port of the second AWGR and $\lambda_8^1, \lambda_2^3, \lambda_4^5, \lambda_6^7$ output by the fourth output port of the third AWGR, so as to obtain an output optical signal group $\lambda_8^1, \lambda_1^2, \lambda_2^3, \lambda_3^4, \lambda_4^5, \lambda_5^6, \lambda_6^7, \lambda_7^8$.

It may be learned from the foregoing description that the optical transmission apparatus shown in FIG. 5A and FIG. 5B can correctly route eight input optical signal groups. In addition, an AWGR scale used by the optical transmission apparatus is a 4×4 AWGR. Compared with the prior art in which a 4×4 AWGR can be used to route merely four optical signal groups, in this embodiment of the present invention, a quantity of to-be-routed optical signals is increased when it is ensured that a center wavelength shift is controllable.

The foregoing uses N=4 merely as an example for description, and this embodiment of the present invention sets no limitation on a specific value of N. For example, when N=8, the optical transmission apparatus provided in this embodiment of the present invention may use four 8×8 AWGRs, 16 comb filters, and 16 optical multiplexers to route 16 input optical signal groups; when N=32, the optical transmission apparatus provided in this embodiment of the present invention may use four 32×32 AWGRs, 64 comb filters, and 64 optical multiplexers to route 64 input optical signal groups.

It may be learned from the foregoing description that, compared with the prior art in which merely one AWGR is used to directly route an optical signal group, in this embodiment of the present invention, one level of filter module is added to the optical transmission apparatus to perform parity optical demultiplexing on an input optical signal and double a wavelength interval. Further, a quantity of input optical signal groups that can be routed by the optical transmission apparatus is doubled. Based on this idea, a person skilled in the art should understand by means of proper inference and analysis that, the optical transmission apparatus provided in this embodiment of the present invention may further include two levels of filter modules to perform parity optical demultiplexing twice on the input optical signal group, and quadruple the wavelength interval. In addition, the optical transmission apparatus further includes two levels of optical multiplexers, configured to perform optical multiplexing twice on an optical signal group output by the router module. That is, each time one level of filter module is added, the quantity of input optical signal groups that can be routed by the optical transmission apparatus is doubled. Specific levels of filter modules included in the optical transmission apparatus may be set according to actual application, and this embodiment of the present invention sets no limitation thereto.

Figure 6:
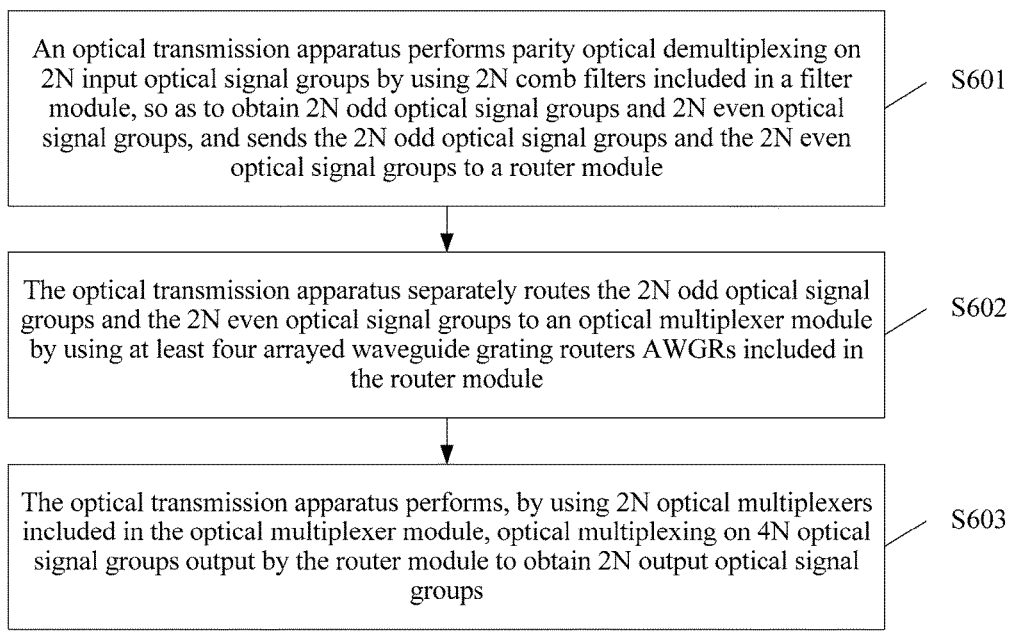
FIG. 6 is a schematic flowchart of an optical transmission method according to an embodiment of the present invention.

An embodiment of the present invention further provides an optical transmission method. The method is applied to the optical transmission apparatus shown in the foregoing apparatus embodiment, the optical transmission apparatus includes a filter module, a router module, and an optical multiplexer module, the filter module is connected to the router module, and the router module is connected to the optical multiplexer module. As shown in FIG. 6, the method includes:

S601. The optical transmission apparatus performs parity optical demultiplexing on 2N input optical signal groups by using 2N comb filters included in the filter module, so as to obtain 2N odd optical signal groups and 2N even optical signal groups, and sends the 2N odd optical signal groups and the 2N even optical signal groups to the router module, where N is a positive integer greater than 1, the input optical signal group includes multiple optical signals, the odd optical signal group of the input optical signal group includes odd optical signals in the input optical signal group, and the even optical signal group of the input optical signal group includes even optical signals in the input optical signal group.

S602. The optical transmission apparatus separately routes the 2N odd optical signal groups and the 2N even optical signal groups to the optical multiplexer module by using at least four arrayed waveguide grating routers AWGRs included in the router module, where the AWGR includes N input ports and N output ports, and the AWGR is configured to switch optical signals input from each input port to the N output ports for output.

S603. The optical transmission apparatus performs, by using 2N optical multiplexers included in the optical multiplexer module, optical multiplexing on 4N optical signal groups output by the router module to obtain 2N output optical signal groups, where each output optical signal group includes one optical signal in each of the 2N input optical signal groups.

Optionally, step S602 includes: routing, by using a first AWGR in the router module, an odd optical signal output by an odd comb filter in the filter module to a first input port of an optical multiplexer connected to the first AWGR; routing, by using a second AWGR in the router module, an odd optical signal output by an even comb filter in the filter module to a second input port of an optical multiplexer connected to the second AWGR; routing, by using a third AWGR in the router module, an even optical signal output by the odd comb filter to a first input port of an optical multiplexer connected to the third AWGR; and routing, by using a fourth AWGR in the router module, an even optical signal output by the even comb filter to a second input port of an optical multiplexer connected to the fourth AWGR.

Optionally, step S603 includes: combining, by each optical multiplexer in the optical multiplexer module, an optical signal group received from a first input port and an optical signal group received from a second input port, and outputting a combined optical signal group, where a $[(K+1)/2]^{th}$ output port of the first AWGR is connected to a first input port of a $K^{th}$ optical multiplexer in the optical multiplexer module, a $[(K+1)/2]^{th}$ output port of the fourth AWGR is connected to a second input port of the $K^{th}$ optical multiplexer in the optical multiplexer module, K is an odd number in a numerical interval [1, 2N], a first output port of the second AWGR is connected to a first input port of a $(2N)^{th}$ optical multiplexer in the optical multiplexer module, an $N^{th}$ output port of the third AWGR is connected to a second input port of the $(2N)^{th}$ optical multiplexer, an $(M/2+1)^{th}$ output port of the second AWGR is connected to a first input port of an $M^{th}$ optical multiplexer in the optical multiplexer module, and an $(M/2)^{th}$ output port of the third AWGR is connected to a second input port of the $M^{th}$ optical multiplexer in the optical multiplexer module, where M is an even number in a numerical interval [1, 2N).

It should be noted that, referring to specific description of the filter module, the router module, and the optical multiplexer module in the foregoing apparatus embodiment, each step of the optical transmission method provided in this embodiment of the present invention may be applied to the foregoing optical transmission apparatus. For brevity of description, details are not described herein.

Although some embodiments of the present invention have been described, a person skilled in the art can make changes and modifications to these embodiments once they learn the basic inventive concept. Therefore, the following claims are intended to be construed as to cover the embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:
1. An optical transmission apparatus, comprising:
a filter, a router, and an optical multiplexer, wherein the filter is connected to the router, and the router is connected to the optical multiplexer;
wherein the filter comprises 2N comb filters, and wherein the filter is configured to perform parity optical demultiplexing on 2N input optical signal groups by using the 2N comb filters to obtain 2N odd optical signal groups and 2N even optical signal groups, and send the 2N odd optical signal groups and the 2N even optical signal groups to the router, wherein N is a positive integer greater than 1, wherein the input optical signal group comprises multiple optical signals, wherein the odd optical signal group of the input optical signal group comprises odd optical signals in the input optical signal group, and wherein the even optical signal group of the input optical signal group comprises even optical signals in the input optical signal group;
wherein the router comprises at least four arrayed waveguide grating routers (AWGRs), wherein the router is configured to separately route the 2N odd optical signal groups and the 2N even optical signal groups to the optical multiplexer by using the at least four AWGRs, wherein each AWGR comprises N input ports and N output ports, and wherein each AWGR is configured to switch optical signals input from each input port to the N output ports for output; and
wherein the optical multiplexer comprises 2N optical multiplexers, wherein the optical multiplexer is configured to perform, by using the 2N optical multiplexers, optical multiplexing on 4N optical signal groups output by the router to obtain 2N output optical signal groups, wherein each output optical signal group comprises one optical signal in each of the 2N input optical signal groups.

2. The optical transmission apparatus according to claim 1, wherein each comb filter comprises a first output port and a second output port, wherein the first output port is configured to output an odd optical signal group, wherein the second output port is configured to output an even optical signal group, and wherein that the filter is connected to the router comprises:
a first output port of a $K^{th}$ comb filter in the filter is connected to an input port of a first AWGR in the router, wherein K is an odd number in a numerical interval [1, 2N];
a first output port of an $L^{th}$ comb filter in the filter is connected to an input port of a second AWGR in the router, wherein L is an even number in the numerical interval [1, 2N];
a second output port of the $K^{th}$ comb filter in the filter is connected to an input port of a third AWGR in the router; and
a second output port of the $L^{th}$ comb filter in the filter is connected to an input port of a fourth AWGR in the router.

3. The optical transmission apparatus according to claim 2, wherein that the filter is connected to the router comprises:
the first output port of the $K^{th}$ comb filter in the filter is connected to a $[(K+1)/2]^{th}$ input port of the first AWGR;
the first output port of the $L^{th}$ comb filter in the filter is connected to an $(L/2)^{th}$ input port of the second AWGR;
the second output port of the $K^{th}$ comb filter in the filter is connected to a $[(K+1)/2]^{th}$ input port of the third AWGR; and the second output port of the $L^{th}$ comb filter in the filter is connected to an $(L/2)^{th}$ input port of the fourth AWGR.

4. The optical transmission apparatus according to claim 3, wherein each optical multiplexer comprises a first input port and a second input port, wherein the first input port is configured to receive the odd optical signal, wherein the second input port is configured to receive the even optical signal, and wherein that the router is connected to the optical multiplexer comprises:
a $[(K+1)/2]^{th}$ output port of the first AWGR is connected to a first input port of a $K^{th}$ optical multiplexer in the optical multiplexer, and a $[(K+1)/2]^{th}$ output port of the fourth AWGR is connected to a second input port of the $K^{th}$ optical multiplexer in the optical multiplexer; and
a first output port of the second AWGR is connected to a first input port of a $(2N)^{th}$ optical multiplexer in the optical multiplexer, an $N^{th}$ output port of the third AWGR is connected to a second input port of the $(2N)^{th}$ optical multiplexer, an $(M/2+1)^{th}$ output port of the second AWGR is connected to a first input port of an $M^{th}$ optical multiplexer in the optical multiplexer, and an $(M/2)^{th}$ output port of the third AWGR is connected to a second input port of the $M^{th}$ optical multiplexer in the optical multiplexer, wherein M is an even number in a numerical interval [1, 2N).

5. An optical transmission method, wherein the method is applied to an optical transmission apparatus, wherein the optical transmission apparatus comprises a filter, a router, and an optical multiplexer, wherein the filter is connected to the router, wherein the router is connected to the optical multiplexer, and wherein the method comprises:
performing, by the optical transmission apparatus, parity optical demultiplexing on 2N input optical signal groups by using 2N comb filters comprised in the filter to obtain 2N odd optical signal groups and 2N even optical signal groups, and sending the 2N odd optical signal groups and the 2N even optical signal groups to the router, wherein N is a positive integer greater than 1, the input optical signal group comprises multiple optical signals, the odd optical signal group of the input optical signal group comprises odd optical signals in the input optical signal group, and the even optical signal group of the input optical signal group comprises even optical signals in the input optical signal group;
separately routing the 2N odd optical signal groups and the 2N even optical signal groups to the optical multiplexer by using at least four arrayed waveguide grating routers (AWGRs) comprised in the router, wherein each AWGR comprises N input ports and N output ports, and wherein each of the AWGRs is configured to switch optical signals input from each input port to the N output ports for output; and
performing, by using 2N optical multiplexers comprised in the optical multiplexer, optical multiplexing on 4N optical signal groups output by the router to obtain 2N output optical signal groups, wherein each output optical signal group comprises one optical signal in each of the 2N input optical signal groups.

6. The method according to claim 5, wherein the separately routing the 2N odd optical signal groups and the 2N even optical signal groups to the optical multiplexer by using at least four AWGRs comprised in the router comprises:

routing, by using a first AWGR in the router, an odd optical signal output by an odd comb filter in the filter to a first input port of an optical multiplexer connected to the first AWGR;
routing, by using a second AWGR in the router, an odd optical signal output by an even comb filter in the filter to a second input port of an optical multiplexer connected to the second AWGR;
routing, by using a third AWGR in the router, an even optical signal output by the odd comb filter to a first input port of an optical multiplexer connected to the third AWGR; and
routing, by using a fourth AWGR in the router, an even optical signal output by the even comb filter to a second input port of an optical multiplexer connected to the fourth AWGR.

7. The method according to claim 6, wherein the performing, by using 2N optical multiplexers comprised in the optical multiplexer, optical multiplexing on 4N optical signal groups output by the router to obtain 2N output optical signal groups comprises:
combining, by each optical multiplexer in the optical multiplexer, an optical signal group received from a first input port and an optical signal group received from a second input port, and outputting a combined optical signal group,
wherein a $[(K+1)/2]^{th}$ output port of the first AWGR is connected to a first input port of a $K^{th}$ optical multiplexer in the optical multiplexer, wherein a $[(K+1)/2]^{th}$ output port of the fourth AWGR is connected to a second input port of the $K^{th}$ optical multiplexer in the optical multiplexer, wherein K is an odd number in a numerical interval [1, 2N], wherein the first output port of the second AWGR is connected to a first input port of a $(2N)^{th}$ optical multiplexer in the optical multiplexer, wherein an $N^{th}$ output port of the third AWGR is connected to a second input port of the $(2N)^{th}$ optical multiplexer, wherein an $(M/2+1)^{th}$ output port of the second AWGR is connected to a first input port of an $M^{th}$ optical multiplexer in the optical multiplexer, and wherein an $(M/2)^{th}$ output port of the third AWGR is connected to a second input port of the $M^{th}$ optical multiplexer in the optical multiplexer, wherein M is an even number in a numerical interval [1, 2N].

* * * * *